United States Patent
Lee et al.

(10) Patent No.: US 8,634,211 B2
(45) Date of Patent: *Jan. 21, 2014

(54) SWITCH CONTROL DEVICE, POWER SUPPLY DEVICE COMPRISING THE SAME AND SWITCH CONTROL METHOD

(75) Inventors: Young-Je Lee, Bucheon (KR); Gye-Hyun Cho, Incheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 280 days.

This patent is subject to a terminal disclaimer.

(21) Appl. No.: 13/111,779

(22) Filed: May 19, 2011

(65) Prior Publication Data

US 2012/0020133 A1  Jan. 26, 2012

(30) Foreign Application Priority Data

Jul. 21, 2010  (KR) .................. 10-2010-0070656

(51) Int. Cl.
  *H02M 3/335* (2006.01)
  *G05F 1/00* (2006.01)

(52) U.S. Cl.
  USPC ........................ 363/21.03; 323/282

(58) Field of Classification Search
  USPC ........................ 323/282; 363/21.03
  See application file for complete search history.

(56) References Cited

U.S. PATENT DOCUMENTS

| | | | |
|---|---|---|---|
| 6,853,150 B2 | 2/2005 | Clauberg et al. | |
| 7,256,554 B2 | 8/2007 | Lys | |
| 2007/0152604 A1* | 7/2007 | Tatsumi | 315/247 |
| 2009/0128106 A1* | 5/2009 | Takahashi et al. | 323/277 |
| 2010/0052569 A1* | 3/2010 | Hoogzaad et al. | 315/294 |
| 2010/0164403 A1* | 7/2010 | Liu | 315/297 |

* cited by examiner

*Primary Examiner* — Adolf Berhane
*Assistant Examiner* — Emily P Pham
(74) *Attorney, Agent, or Firm* — Okamoto & Benedicto LLP (57) ABSTRACT

A power voltage required to operate the switch control device is generated by using full-wave current rectification voltage generated by rectifying an AC input. A zero cross-point is detected when a full-wave rectification voltage is zero voltage by using the power voltage. A reference signal synchronized to the full-wave rectification voltage is generated by using the detected zero cross-point. A switching operation of a power switch is controlled by comparing a reference signal with current that flows on the power switch.

20 Claims, 4 Drawing Sheets

SWITCH CONTROL DEVICE, POWER SUPPLY DEVICE COMPRISING THE SAME AND SWITCH CONTROL METHOD

CROSS-REFERENCE TO RELATED APPLICATION

This application claims priority to and the benefit of Korean Patent Application No. 10-2010-0070656 filed in the Korean Intellectual Property Office on Jul. 21, 2010, the entire contents of which are incorporated herein by reference.

BACKGROUND OF THE INVENTION (a) Field of the Invention

The present invention relates to a switch control device controlling a switching operation, a power supply device comprising the same, and a switch control method.

(b) Description of the Related Art

Figure 1:
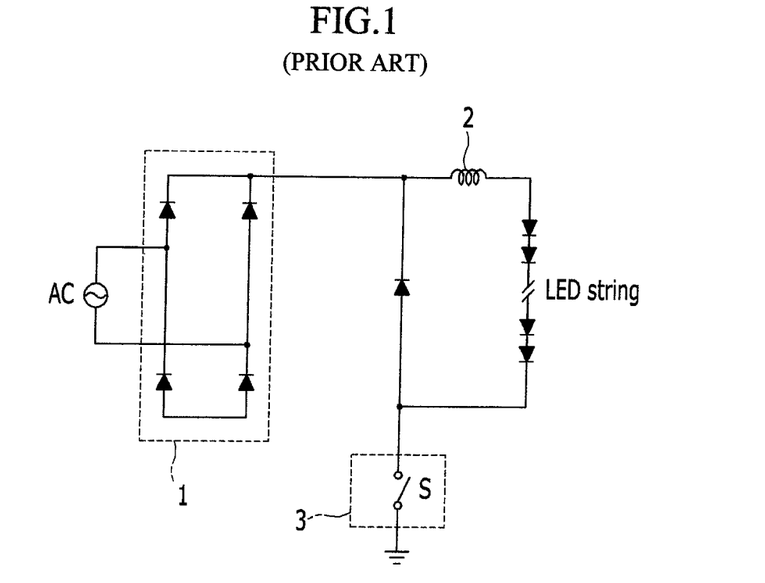
FIG. 1 is a diagram illustrating a power supply device using a buck converter.

FIG. 1 is a diagram illustrating a power supply device using a buck converter. In FIG. 1, a load of the power supply device is an LED string constituted by a plurality of LEDs. In FIG. 1, a rectifying diode is implemented as a bridge diode 1.

As shown in FIG. 1, in an LED light emitting device, AC power is rectified through a bridge diode 1. The bridge diode 1 full-rectifies input AC power AC. Rectified voltage, that is, input voltage is supplied to an inductor 2 and the inductor 2 supplies driving current to the LED string depending on an operation of a power switch S. A switching unit 3 including the power switch S controls a switching operation of the power switch S.

When the power switch S is turned on, inductor current IL which flows on the inductor 2 increases and when the power switch S is turned off, the inductor current IL decreases. The maximum value of the inductor current IL depends on full-rectified voltage passing through the bridge diode 1 during one switching cycle. Accordingly, a peak value of the inductor current IL depends on a full-rectified sine wave.

A duty of the power switch S is determined depending on input voltage. Specifically, as the input voltage increases, the duty decreases and as the input voltage decreases, the duty increases. At this time, information on the input voltage is required to control the switching operation of the power switch S.

An envelop of the input voltage inputted into the power switch S that is electrically connected to the bridge diode 1 has the same phase and frequency as input voltage of a converter. Accordingly, the input voltage may be sensed by using voltage at an input terminal of the power switch S.

However, in a section where the input voltage is close to 0, the voltage at the input terminal of the power switch S is vulnerable to noise.

Therefore, a zero cross-point where the input voltage is 0 is not sensed to cause the malfunction of the power switch S.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a switch control device, a power supply device comprising the same, and a switch control method having advantages of accurately detecting a zero cross-point of input voltage.

An exemplary embodiment of the present invention provides a switch control device for controlling a switching operation of a power switch that includes: a self power voltage biasing circuit generating power voltage required to operate the switch control device by using voltage at an input terminal of the power switch; a reference signal generator estimating a zero cross-point when the input-terminal voltage is zero voltage by using the power voltage and generating a reference signal synchronized to the input-terminal voltage of the power switch by using the estimated zero cross-point; and a PWM controller controlling the switching operation of the power switch by comparing the reference signal with current that flows on the power switch.

The self power voltage biasing circuit includes a high voltage device generating current corresponding to the input-terminal voltage; and a high voltage controller controlling the high voltage device on the basis of a result of comparing predetermined reference voltage with divided voltage. Further, the self power voltage biasing circuit further includes a comparator comparing the reference voltage with the divided voltage; a transistor performing the switching operation in accordance with an output of the comparator; and first and second resistors dividing the power voltage. When the divided voltage is equal to or larger than the reference voltage, the transistor is turned on to ground the high voltage controller in the self power voltage biasing circuit.

The reference signal generator includes a zero cross detection circuit receiving the divided voltage corresponding to the power voltage and detecting a zero cross period corresponding to the zero cross-point by using the divided voltage; a digital sine wave generator estimating the zero cross-point in accordance with the detected zero cross period, estimating one cycle of the input-terminal voltage in accordance with the estimated zero cross-point, generating a reference clock signal to allow the reference signal to synchronize with the input-terminal voltage of the power switch by using the estimated one cycle of the input-terminal voltage and a predetermined clock signal, and generating a full-wave rectification signal which increases and thereafter, decrease in accordance with the reference clock signal during one cycle of the input-terminal voltage; and a digital-analog converter generating the reference signal by converting the digital signal to an analog signal. The reference clock signal includes edges as many as a predetermined reference number of times during one cycle of the input-terminal voltage.

The digital sine wave generator increases the full-wave rectification digital signal from a time when a first edge of the reference clock signal to a time when the reference clock signal edge corresponding to a half of the reference number of times is generated and decreases the full-wave rectification digital signal from a time when the next edge of the reference clock signal edge corresponding to the half of the reference number of times is generated to a time when the edge of the reference clock signal corresponding to the reference number of times is generated, during the one cycle of the input-terminal voltage.

The zero cross detection circuit detects the zero cross period by comparing the divided voltage with first detection reference voltage and second detection reference voltage having different levels. The zero cross detection circuit includes a first resistor of which one end is connected to predetermined reference voltage; a second resistor of which one end connected to the other end of the first resistor; a third resistor including one end connected to the other end of the second resistor and the other end which is grounded; and a hysteresis comparator including an inversion terminal connected to a common node between the first resistor and the second resistor, the other inversion terminal connected to a common node between the second resistor and a third resistor, and a non-inversion terminal into which the divided voltage is inputted. The first detection reference voltage is the common node voltage between the second resistor and the third resistor and the second detection reference voltage is the common node voltage between the first resistor and the second resistor.

Another exemplary embodiment of the present invention provides a switch control method of a power switch that includes: generating power voltage by using input-terminal voltage of the power switch; estimating a zero cross-point when the input-terminal voltage is zero voltage by using the power voltage; and generating a reference signal synchronized to the input-terminal voltage of the power switch by using the detected zero cross-point. The switch control method further includes controlling a switching operation of the power switch by comparing the reference signal with current which flows on the power switch.

The generating of the power voltage includes generating current corresponding to the input-terminal voltage; and controlling the supplying of the current on the basis of the result of comparing predetermined reference voltage with divided voltage corresponding to the power voltage.

The generating of the reference signal includes receiving the divided voltage corresponding to the power voltage and detecting a zero cross period corresponding to the zero cross-point by using the divided voltage; estimating the zero cross-point in accordance with the detected zero cross period; estimating one cycle of the input-terminal voltage in accordance with the estimated zero cross-point; generating a reference clock signal synchronized to allow the reference signal to synchronize with the input-terminal voltage of the power switch by using the estimated one cycle of the input-terminal voltage and a predetermined clock signal; generating a full-wave rectification digital signal which increases and thereafter, decreases in accordance with the reference clock signal during the estimated one cycle of the input-terminal voltage; and generating the reference signal by converting the digital signal into an analog signal. The reference clock signal includes edges as many as a predetermined reference number of times during one cycle of the input-terminal voltage.

The generating of the digital signal includes increasing the full-wave rectification digital signal from a time when a first edge of the reference clock signal is generated to a time when the reference clock signal edge corresponding to a half of the reference number of times is generated, during the one cycle of the input-terminal voltage; and decreasing the full-wave rectification digital signal from a time when the next edge of the reference clock signal edge corresponding to a half of the reference number of times is generated to a time when the reference clock signal edge corresponding to the reference number of times is generated.

The detecting of the zero cross period includes detecting the zero cross period by comparing the divided voltage with first detection reference voltage and second detection reference voltage having different levels.

Yet another exemplary embodiment of the present invention provides a power supply device that includes: a power switch inputted with full-wave current rectification voltage generated by rectifying an AC input; and a switch control device for controlling a switching operation of the power switch. The switch control device includes a self power voltage biasing circuit generating power voltage required to operate the switch control device by using the full-wave rectification voltage; a reference signal generator detecting a zero cross-point when the full-wave rectification voltage is zero voltage by using the power voltage and generating a reference signal synchronized to the full-wave rectification voltage of the power switch by using the detected zero cross-point; and a PWM controller controlling the switching operation of the power switch by comparing the reference signal with current that flows on the power switch.

The self power voltage biasing circuit includes a high voltage device generating current corresponding to the full-wave rectification voltage; and a high voltage controller controlling the high voltage device on the basis of a result of comparing predetermined reference voltage with divided voltage. The self power voltage biasing circuit further includes a comparator comparing the reference voltage with the divided voltage; a transistor performing the switching operation in accordance with an output of the comparator; and first and second resistors dividing the power voltage. When the divided voltage is equal to or larger than the reference voltage, the transistor is turned on to ground the high voltage controller.

The reference signal generator includes a zero cross detection circuit receiving the divided voltage corresponding to the power voltage and detecting a zero cross period corresponding to the zero cross-point by using the divided voltage; a digital sine wave generator estimating the zero cross-point in accordance with the detected zero cross period, estimating one cycle of the full-wave rectification voltage in accordance with the estimated zero cross-point, generating a reference clock signal to allow the reference signal to synchronize with the input-terminal voltage of the power switch by using the estimated one cycle of the full-wave rectification voltage and a predetermined clock signal, and generating a full-wave rectification signal which increases and thereafter, decrease in accordance with the reference clock signal during one cycle of the full-wave rectification voltage; and a digital-analog converter generating the reference signal by converting the digital signal to an analog signal. The reference clock signal includes edges as many as a predetermined reference number of times during one cycle of the full-wave rectification voltage.

The digital sine wave generator increases the full-wave rectification digital signal from a time when a first edge of the reference clock signal to a time when the reference clock signal edge corresponding to a half of the reference number of times is generated and decreases the full-wave rectification digital signal from a time when the next edge of the reference clock signal edge corresponding to the half of the reference number of times is generated to a time when the edge of the reference clock signal corresponding to the reference number of times is generated, during the one cycle of the full-wave rectification voltage.

The zero cross detection circuit detects the zero cross period by comparing the divided voltage with first detection reference voltage and second detection reference voltage having different levels. The zero cross detection circuit includes a first resistor of which one end is connected to predetermined reference voltage; a second resistor of which one end connected to the other end of the first resistor; a third resistor including one end connected to the other end of the second resistor and the other end which is grounded; and a hysteresis comparator including an inversion terminal connected to a common node between the first resistor and the second resistor, the other inversion terminal connected to a common node between the second resistor and a third resistor, and a non-inversion terminal into which the divided voltage is inputted. The first detection reference voltage is the common node voltage between the second resistor and the third resistor and the second detection reference voltage is the common node voltage between the first resistor and the second resistor.

According to the exemplary embodiments of the present invention, there are provided a switch control device, a power supply device comprising the same, and a switch control method which can accurately detect a zero cross-point of input voltage without being influenced by noise.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, a switch control device, a power supply device comprising the same, and a switch control method according to an exemplary embodiment of the present invention will be described in detail with reference to the accompanying drawings.

Figure 2:
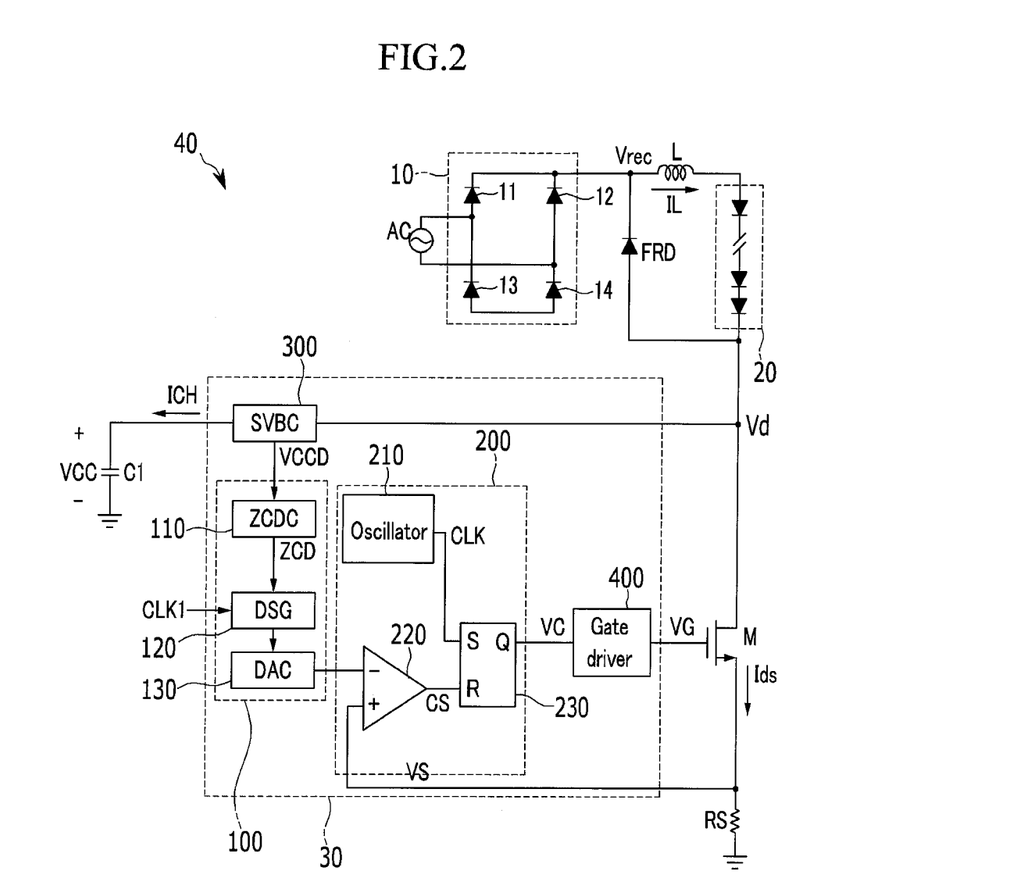
FIG. 2 is a diagram illustrating a switch control device and a power supply device comprising the same according to an exemplary embodiment of the present invention.

FIG. 2 is a diagram illustrating a switch control device 30 and a power supply device 40 comprising the same according to an exemplary embodiment of the present invention. The power supply device according to the exemplary embodiment of the present invention is implemented as a buck converter, but the present invention is not limited thereto. The power supply device 40 according to the exemplary embodiment of the present invention supplies electric power to the LED string 20 in which a plurality of LEDs are connected in series.

As shown in FIG. 2, a power switch M performs a switching operation in accordance with a gate signal VG transferred from the switch control device 30. The power switch M is implemented as an n-channel metal oxide semiconductor field effect transistor (NMOSFET). The present invention is not limited thereto and as necessary, may adopt transistor elements of other types.

The power supply device 40 includes the power switch M, a bridge diode 10, a diode FRD, an inductor L, and the switch control device 30. Each of the switch control device 30 and the power switch M is one chip and two components may be formed as one package.

The bridge diode 10 is constituted by four diodes 11 to 14 and full-wave rectifies input alternating current (AC) to generate full-wave rectification voltage Vrec.

An output terminal of a bridge diode 11 is connected to one end of the inductor L. The full-wave rectification voltage Vrec is supplied to one end of the inductor L and the other end of the inductor L is connected to one end of the LED string 20. The diode FRD as a fast recovery diode is connected to a drain electrode of the power switch M and one end of the inductor L. The diode FRD supplies current to the inductor L and the LED string while the power switch M is turned off.

The drain electrode of the power switch M is connected to the other end of the LED string 3, a source electrode is connected to one end of a sense resistor RS, and the gate signal VG transferred from the switch control device 30 is inputted into a gate electrode. The power switch M is switched by the gate signal VG.

The power switch M is turned on and the inductor current IL flows through the LED string 3 and the power switch M. Current (hereinafter, referred to as drain current Ids) that flows on the power switch M flows on the resistor RS to generate sense voltage VS. Through the switching operation of the power switch M, current rectified by the bridge diode 10 is supplied to the LED string 20. When the power switch M is turned on, the inductor current IL that flows on the inductor L is generated and the LED string 20 emits light depending on the inductor current IL.

The switch control device 30 generates power voltage VCC by using voltage (hereinafter, referred to as 'drain voltage Vd') of an input terminal of the power switch M, that is, the drain electrode of the power switch M in the exemplary embodiment and detects a zero cross-point of the full-wave rectification voltage Vrec by using the power voltage VCC. The switch control device 30 generates a reference signal REF having the same phase and size as the full-wave rectification voltage Vrec by using the detected zero cross-point and controls the switching operation of the power switch M by using the reference signal REF and the sense voltage VS.

Peak flow (envelop) of drain voltage Vd according to the exemplary embodiment has the same phase and frequency as the full-wave rectification voltage Vrec. Specifically, when the power switch M is turned off by the gate signal VG, the drain voltage Vd has a waveform of the full-wave rectification voltage Vrec and when the power switch M is turned on by the gate signal VG, the drain voltage Vd is determined by the drain current Ids and the sense resistor RS.

The switch control device 30 includes a self VCC biasing circuit (hereinafter, referred to as SVBC) 300, a reference signal generator 100, a PWM controller 200, and a gate driver 400.

Hereinafter, referring to FIG. 3 in addition to FIG. 2, components of the switching control device 30 will be described in detail.

Figure 3:
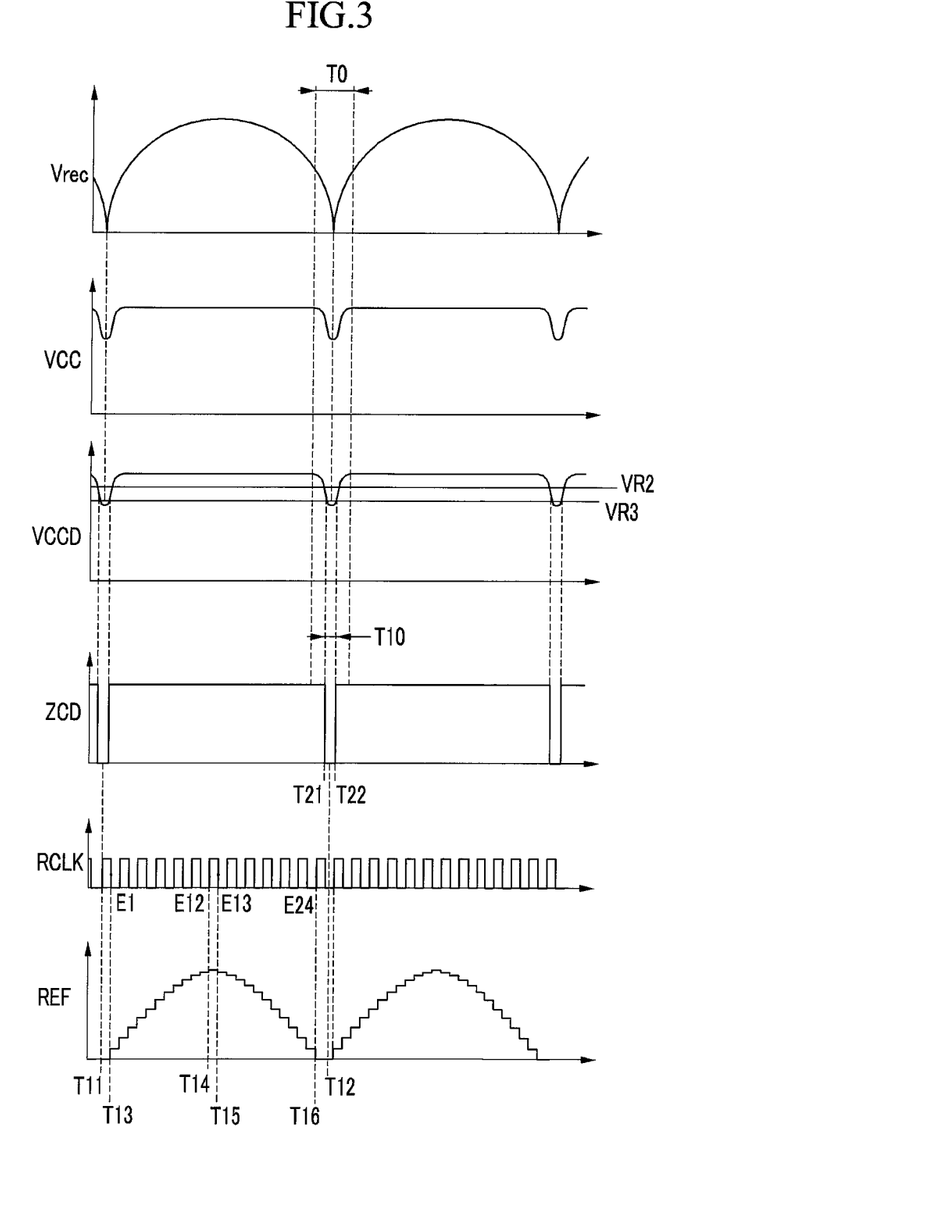
FIG. 3 is a waveform diagram illustrating full-wave rectification voltage, power voltage, divided voltage, a zero crossing detection signal, a reference clock signal, and a reference signal according to an exemplary embodiment of the present invention.

FIG. 3 is a waveform diagram illustrating full-wave rectification voltage Vrec, power voltage VCC, divided voltage VCCD, a zero crossing detection signal ZCD, a reference clock signal RCLK, and a reference signal REF.

The SVBC 300 generates charging current ICPH for charging a capacitor C1 by using the drain voltage Vd to generate the power voltage VCC. The power voltage VCC is required to operate the switch control device 30.

Charging current ICH for charging the capacitor C1 is low around the zero cross-point (T0 of FIG. 3) of the full-wave rectification voltage Vrec. Since the full-wave rectification voltage Vrec is low, the drain voltage Vd is also low and when the drain voltage is low, drain-source voltage of a transistor (341 of FIG. 4) of the SVBC generating the charging current ICH. Therefore, the SVBC cannot generate charging current ICH enough to constantly maintain the power voltage VCC as regulated voltage. The power voltage VCC around the zero cross-point T0 of the full-wave rectification voltage Vrec has a waveform which decreases and thereafter, increases in synchronization with the waveform of the full-wave rectification voltage Vrec. Hereinafter, the vicinity of the zero cross-point of the full-wave rectification voltage Vrec is referred to as a power voltage variation section (T0).

The SVBC 300 generates predetermined voltage VCCD corresponding to the power voltage VCC and transfers it to the reference voltage generator 100. The voltage VCD may be voltage generated by resistively dividing the power voltage VCC. Hereinafter, the voltage VCCD is referred to as the divided voltage. The divided voltage VCCD also has the waveform which decreases and thereafter, increases in synchronization with the waveform of the full-wave rectification voltage Vrec in the power voltage variation section T0 as shown in FIG. 3.

The reference signal generator 100 receives the divided voltage VCCD to detect the zero cross-point of the full-wave rectification voltage Vrec, generate a reference signal REF synchronized with the full-wave rectification voltage Vrec, and transfer the reference signal REF to the PWM controller 200. The reference signal generator 100 includes a zero cross detection circuit (hereinafter referred to as 'ZCDC') 110, a digital sine wave generator (hereinafter, referred to as 'DSG') 120, and a digital-analog converter (hereinafter, referred to as 'DAC') 130.

The ZCDC 110 detects a zero cross period T10 corresponding to the zero cross-point by using the divided voltage VCCD and generates a zero cross detection signal ZCD representing the zero cross period T10. The zero cross detection signal ZCD according to the exemplary embodiment is a pulse signal having a low level during the zero cross period T10 and a high level during other periods as shown in FIG. 3.

The DSG 120 generates a full-wave rectification digital signal FRDS which increases or decreases depending on the increase or decrease of the full-wave rectification voltage Vrec during one cycle of the full-wave rectification voltage Vrec by using the zero cross detection signal ZCD. The DSG 120 estimates consecutive zero cross-points by using the zero cross detection signal ZCD and sets an interval between the estimated zero cross-points as one cycle of the full-wave rectification voltage Vrec. In addition, the DSG 120 generates a full-wave digital signal FRDS which increases and thereafter, decreases during one cycle of the full-wave rectification voltage Vrec. Since the full-wave rectification voltage Vrec is a sine wave form which increases and thereafter, decreases during one cycle, an increase amount and a decrease amount of the full-wave rectification digital signal FRDS may be set as appropriate digital values for implementing a sine wave.

The DAC 130 converts the inputted full-wave rectification digital signal FRDS into an analog voltage signal in real time to generate and output the reference signal REF. Therefore, the reference signal REF which increases or decreases in synchronization with the full-wave rectification voltage Vrec is generated.

The DSG 120 generates a reference clock signal RCLK including edges of a predetermined number during one cycle of the full-wave rectification voltage Vrec which is estimated. Specifically, the DSG 120 generates the reference clock signal RCLK including edges of a predetermined number during one cycle of the full-wave rectification voltage Vrec which is estimated by dividing a predetermined clock signal CLK1. In this case, the predetermined number may be appropriately set for the reference signal REF to have a waveform similar to the full-wave rectification voltage Vrec. Hereinafter, the number of edges of the reference clock signal RCLK during one cycle of the full-wave rectification voltage Vrec is the reference number of times.

The full-wave rectification digital signal FRDS according to the exemplary embodiment of the present invention is an n-bit digital signal. The DSG 120 transfers the digital signal FRDS to the DAC 130 in synchronization with the reference clock signal RCLK.

During one cycle of the full-wave rectification voltage Vrec, the full-wave rectification digital signal FRDS increases and thereafter, decreases such that the reference signal REF has a similar waveform to the full-wave rectification voltage Vrec. During a period corresponding a half of one cycle of the reference signal REF, the full-wave rectification digital signal FRDS gradually increases. During a period corresponding to the rest half of one cycle of the reference signal REF, the full-wave rectification digital signal FRDS gradually decreases.

For example, when it is judged that a middle point between rising and falling edge points of the zero cross detection signal ZCD is the zero cross detection point, one cycle of the full-wave rectification voltage Vrec is a period T11 to T12. During one cycle T11 to T12, the reference number of times is set to 24. As shown in FIG. 3, the reference clock signal RCLK includes 24 edges during one cycle of the full-wave rectification voltage Vrec.

During a period to a point T14 when a twelfth edge E12 is generated from a point T13 when a first edge E1 is generated after a first zero cross-point T11 among the consecutive zero cross-points, the DSG 120 increases a value of the full-wave rectification digital signal FRDS and during a period to a point T16 when a twenty fourth edge E24 is generated from a point T15 when a thirteenth edge E13 is generated, the DSG 120 decreases the value of the full-wave rectification digital signal FRDS.

Therefore, as shown in FIG. 3, the waveform of the reference signal REF is a waveform which increases to the twelfth edge E12 from the first edge E1 of the reference clock signal RCLK and decreases to the twenty fourth edge E24 from the thirteenth edge E13. The DSG 120 according to the exemplary embodiment of the present invention increases or decreases the full-wave rectification digital signal FRDS in synchronization with the rising edge and the falling edge of the reference clock signal RCLK which consecutively occur and the present invention is not limited thereto. The DSG 120 may increase or decrease the full-wave rectification digital signal FRDS in synchronization with only the rising edge or the falling edge of the reference clock signal RCLK.

Further, the DSG 120 according to the exemplary embodiment of the present invention sets the zero cross-point as the middle point between the rising edge and the falling edge of the zero cross detection signal, but contrary to this, may set the zero cross-point as the rising edge or the falling edge. Since the period T10 of the zero cross detection signal ZCD is a very short time, the middle point, the rising edge point, and the falling edge point may be temporally very close to each other.

The PWM controller 200 includes a PWM comparator 220, an oscillator 210, an SR latch 230, and a gate driver 400.

The PWM comparator 220 includes a non-inversion terminal (+) inputted with sense voltage VS and an inversion terminal (−) inputted with the reference signal REF. When the signal inputted into the non-inversion terminal (+) is higher than the signal inputted into the inversion terminal (−), the PWM comparator 220 outputs a comparison signal CS of high level and otherwise, it outputs a comparison signal CS of low level. The oscillator 210 generates a clock signal CLK determining a switching frequency of the power switch M.

The SR latch 230 generates a gate control signal VC in accordance with the signal CLK. The SR latch 230 includes a set terminal S inputted with the clock signal CLK, a reset terminal R inputted with the comparison signal CS, and an output terminal Q. The SR latch 230 outputs a signal of high level in synchronization with a rising edge of the signal inputted into the set terminal S and outputs a signal of low level in synchronization with a rising edge of the signal inputted into the reset terminal R. Therefore, the SR latch 230 generates a gate control signal VC of high level in synchronization with a rising edge of the clock signal CLK and generates a gate control signal VC of low level in synchronization with a rising edge of the comparison signal CS.

The gate driver 400 generates the gate signal VG controlling the switching operation of the power switch in accordance with the gate control signal VC. When the gate signal VG is at high level, the power switch M is turned on and when the gate signal VG is at low level, the power switch M is turned on. The gate driver 400 generates the gate signal VG of high level in accordance with the gate control signal VC of high level and generates the gate signal VG of low level in accordance with the gate control signal VC of low level.

Figure 4:
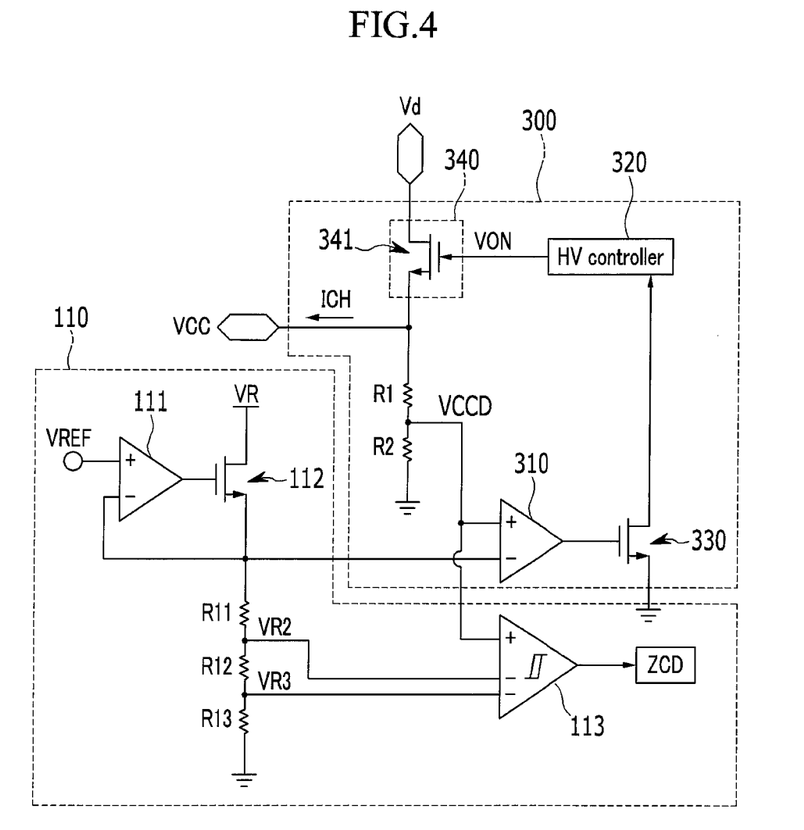
FIG. 4 is a diagram illustrating an SVBC and a ZCDC according to an exemplary embodiment of the present invention.

FIG. 4 is a diagram illustrating an SVBC 300 and a ZCDC 110 according to an exemplary embodiment of the present invention.

As shown in FIG. 4, the SVBC 300 includes a high voltage device 340, a high voltage device controller (hereinafter, referred to as 'HV controller') 320, a comparator 310, two resistors R1 and R2, and a transistor 330.

The high voltage device 340 according to the exemplary embodiment of the present invention includes a junction gate field-effect transistor (JFET) 341. The JFET 341 is turned on by a control signal VON outputted from the HV controller 320 and generates current corresponding to the drain voltage Vd. While the JFET 341 is turned on by the control signal VON, the JFET 341 generates current which increases in proportion to the drain voltage Vd in a linear region. When the drain voltage Vd increases to cause the JFET 341 to operate in a saturation region, the current of the JFET 341 is constantly maintained regardless of the drain voltage Vd. The JFET 341 supplies the charging current ICH charging a capacitor CC.

Voltage which is divided in accordance with a resistance ratio between the resistor R1 and the resistor R2 and is generated at a common node of the resistor R1 and the resistor R2 is the divided voltage VCCD.

The comparator 310 turns on the transistor 330 when the divided voltage VCCD is larger than reference voltage VREF. Therefore, the HV controller 320 is grounded by the transistor 330 and the HV controller 320 generates a control signal VON of level enough to turn off the JFET 341. When the JFET 341 is turned off, the charging current ICH is interrupted. The comparator 310 turns off the transistor 330 when the divided voltage VCCD is smaller than the reference voltage VREF. Therefore, the HV controller 320 generates a control signal VON of level enough to turn on the JFET 341. When the JFET 341 is turned on, the charging current is supplied to the capacitor CC. By such a method, the power voltage VCC is maintained as predetermined voltage by the charging current ICH in a section other than the vicinity of the zero cross-point T0 as shown in FIG. 3.

The ZCDC 110 includes an operation amplifier 111, a transistor 112, three resistors R11, R12, and R13, and a hysteresis comparator 113.

The reference voltage VREF is inputted into a non-inversion terminal (+) of the operation amplifier 111 and an inversion terminal (−) is connected to a source electrode of the transistor 112. An output terminal of the operation amplifier 111 is connected to a gate electrode of the transistor 112. Another power voltage VR is inputted into a drain electrode of the transistor 112. The power voltage VR supplies voltage required to operate the ZCDC 110.

The operation amplifier 111 adjusts resistance of the transistor 112 to maintain the voltage of the inversion terminal (−) as the reference voltage VREF at all times when the reference voltage of the non-inversion terminal (+) is different from the voltage of the inversion terminal (−).

The resistors R11, R12, and R13 are, in series, connected to each other between the inversion terminal (−) of the operation amplifier 111 and a ground terminal. The reference voltage VREF is divided by three resistors R11 to R13 to generate first detection reference voltage VR2 and second detection reference voltage VR3 shown in FIG. 3.

As described above, the ZCDC 110 uses the power voltage VCC in order to detect the zero cross-point. The hysteresis comparator 113 detects ZCD on the basis of a result of comparing the first detection reference voltage VR2 and the second detection reference voltage VR3 with the divided voltage VCCD corresponding to the power voltage VCC.

The hysteresis comparator 113 generates ZCD of low level when the decreased divided voltage VCCD reaches the second detection reference voltage VR3 and generates ZCD of high level when the increased dividing voltage VCCD reaches the first detection reference voltage VR2.

As shown in FIG. 3, at the point T21, the divided voltage VCCD reaches the second detection reference voltage VR3 to generate a falling edge of the ZCD and at the point T22, the divided voltage VCCD reaches the first detection reference voltage VR2 to generate a rising edge of the ZCD.

As such, according to the exemplary embodiments of the present invention, since the zero cross-point is estimated by using the power voltage VCC, it is possible to prevent the influence of noise generated in the drain voltage Vd.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

Power switch M, Bridge diode 1, 10, Diode FRD, Inductor 2, L

LED string 20, Reference signal generator 100, PWM controller 200

Reference signal REF, ZCDC 110, DSG 120, DAC 130

PWM comparator 220, Oscillator 210, SR latch 230, Gate driver 400

Clock signal CLK

What is claimed is:

1. A switch control device for controlling a switching operation of a power switch, comprising:
   a self power voltage biasing circuit generating a power voltage required to operate the switch control device from an input-terminal voltage at an input terminal of the power switch;

a reference signal generator estimating a zero cross-point when the input-terminal voltage is a zero voltage based on a level of the power voltage and generating a reference signal synchronized to the input-terminal voltage of the power switch by using the zero cross-point; and a PWM controller controlling the switching operation of the power switch by comparing the reference signal with current that flows on the power switch.

2. The device of claim 1, wherein:

the self power voltage biasing circuit includes a high voltage device generating current corresponding to the input-terminal voltage and a high voltage controller controlling the high voltage device based on a result of comparing a predetermined reference voltage with a divided voltage.

3. The device of claim 2, wherein the self power voltage biasing circuit further includes:

a comparator comparing a reference voltage with the divided voltage;

a transistor performing the switching operation in accordance with an output of the comparator; and first and second resistors dividing the power voltage to generate the divided voltage, and when the divided voltage is equal to or larger than the reference voltage, the transistor is turned on to ground the high voltage controller.

4. The device of claim 1, wherein the reference signal generator includes:

a zero cross detection circuit receiving the divided voltage corresponding to the power voltage and detecting a zero cross period corresponding to the zero cross-point by using the divided voltage;

a digital sine wave generator estimating the zero cross-point in accordance with the detected zero cross period, estimating one cycle of the input-terminal voltage in accordance with the zero cross-point to generate an estimated one cycle of the input-terminal voltage, generating a reference clock signal to allow the reference signal to synchronize with the input-terminal voltage of the power switch by using the estimated one cycle of the input-terminal voltage and a predetermined clock signal, and generating a full-wave rectification digital signal which increases and thereafter decreases in accordance with the reference clock signal during the one cycle of the input-terminal voltage; and a digital-analog converter generating the reference signal by converting the full-wave rectification digital signal to an analog signal.

5. The device of claim 4, wherein:

the reference clock signal includes edges as many as a predetermined reference number of times during the one cycle of the input-terminal voltage, and the digital sine wave generator increases the full-wave rectification digital signal from a time when a first edge of the reference clock signal occurs to a time when an edge of the reference clock signal corresponding to a half of the predetermined reference number of times is generated and decreases the full-wave rectification digital signal from a time after occurrence of the half of the predetermined reference number of times to a time when an edge of the reference clock signal corresponding to the predetermined reference number of times is generated during the one cycle of the input-terminal voltage.

6. The device of claim 4, wherein:

the zero cross detection circuit detects the zero cross period by comparing the divided voltage with a first detection reference voltage and a second detection reference voltage having different levels.

7. The device of claim 6, wherein:

the zero cross detection circuit includes a first resistor of which one end is connected to a predetermined reference voltage;

a second resistor of which one end is connected to another end of the first resistor;

a third resistor including one end connected to another end of the second resistor and another end which is grounded; and a hysteresis comparator including an inversion terminal connected to a common node between the first resistor and the second resistor, another inversion terminal connected to a common node between the second resistor and a third resistor, and a non-inversion terminal into which the divided voltage is inputted, and the first detection reference voltage is a common node voltage at the common node between the second resistor and the third resistor and the second detection reference voltage is a common node voltage at the common node between the first resistor and the second resistor.

8. A switch control method of a power switch, comprising:

generating a power voltage from an input-terminal voltage of the power switch;

estimating a zero cross-point when the input-terminal voltage is a zero voltage based on a level of the power voltage; and generating a reference signal synchronized to the input-terminal voltage of the power switch from a detection of the zero cross-point.

9. The method of claim 8, further comprising:

controlling a switching operation of the power switch by comparing the reference signal with current which flows on the power switch.

10. The method of claim 8, wherein:

the generating of the power voltage includes generating current corresponding to the input-terminal voltage; and controlling supplying of the current based on a result of comparing a predetermined reference voltage with a divided voltage corresponding to the power voltage.

11. The method of claim 8, wherein the generating of the reference signal includes:

receiving the divided voltage corresponding to the power voltage and detecting a zero cross period corresponding to the zero cross-point by using the divided voltage;

estimating the zero cross-point in accordance with the detected zero cross period;

estimating one cycle of the input-terminal voltage in accordance with the zero cross-point to generate an estimated one cycle of the input-terminal voltage;

generating a reference clock signal synchronized to allow the reference signal to synchronize with the input-terminal voltage of the power switch by using the estimated one cycle of the input-terminal voltage and a predetermined clock signal;

generating a full-wave rectification digital signal which increases and thereafter decreases in accordance with the reference clock signal during the estimated one cycle of the input-terminal voltage; and generating the reference signal by converting the full-wave rectification digital signal into an analog signal.

12. The method of claim 11, wherein:
the reference clock signal includes edges as many as a predetermined reference number of times during the one cycle of the input-terminal voltage; and
the generating of the full-wave rectification digital signal includes: increasing the full-wave rectification digital signal from a time when a first edge of the reference clock signal is generated to a time when an edge of the reference clock signal corresponding to a half of the predetermined reference number of times is generated during the one cycle of the input-terminal voltage; and
decreasing the full-wave rectification digital signal from a time after occurrence of the half of the predetermined reference number of times to a time when an edge of the reference clock signal corresponding to the predetermined reference number of times is generated.

13. The method of claim 11, wherein:
the detecting of the zero cross period includes detecting the zero cross period by comparing the divided voltage with a first detection reference voltage and a second detection reference voltage having different levels.

14. A power supply device, comprising:
a power switch inputted with a full-wave rectification voltage generated by rectifying an AC input; and
a switch control device for controlling a switching operation of the power switch, the switch control device comprising:
a self power voltage biasing circuit generating a power voltage required to operate the switch control device by using the full-wave rectification voltage;
a reference signal generator detecting a zero cross-point when the full-wave rectification voltage is a zero voltage based on a level of the power voltage and generating a reference signal synchronized to the full-wave rectification voltage based on detection of the zero cross-point; and
a PWM controller controlling the switching operation of the power switch by comparing the reference signal with current that flows on the power switch.

15. The device of claim 14, wherein:
the self power voltage biasing circuit includes a high voltage device generating current corresponding to the full-wave rectification voltage, and a high voltage controller controlling the high voltage device based on a result of comparing a predetermined reference voltage with a divided voltage.

16. The device of claim 15, wherein the self power voltage biasing circuit further includes:
a comparator comparing the predetermined reference voltage with the divided voltage;
a transistor performing the switching operation in accordance with an output of the comparator; and
first and second resistors dividing the power voltage, and when the divided voltage is equal to or larger than the predetermined reference voltage, the transistor is turned on to ground the high voltage controller.

17. The device of claim 14, wherein the reference signal generator includes:
a zero cross detection circuit receiving the divided voltage corresponding to the power voltage and detecting a zero cross period corresponding to the zero cross-point by using the divided voltage;
a digital sine wave generator estimating the zero cross-point in accordance with the detected zero cross period, estimating one cycle of the full-wave rectification voltage in accordance with the zero cross-point to generate an estimated one cycle of the full-wave rectification voltage, generating a reference clock signal to allow the reference signal to synchronize with an input-terminal voltage of the power switch by using the estimated one cycle of the full-wave rectification voltage and a predetermined clock signal, and generating a full-wave rectification digital signal which increases and thereafter decreases in accordance with the reference clock signal during the one cycle of the full-wave rectification voltage; and
a digital-analog converter generating the reference signal by converting the full-wave rectification digital signal to an analog signal.

18. The device of claim 17, wherein:
the reference clock signal includes edges as many as a predetermined reference number of times during the one cycle of the full-wave rectification voltage, and
the digital sine wave generator increases the full-wave rectification digital signal from a time when a first edge of the reference clock signal is generated to a time when an edge of the reference clock signal corresponding to a half of the predetermined reference number of times is generated and decreases the full-wave rectification digital signal from a time after occurrence of the half of the predetermined reference number of times to a time when an edge of the reference clock signal corresponding to the predetermined reference number of times is generate during the one cycle of the full-wave rectification voltage.

19. The device of claim 17, wherein:
zero cross detection circuit detects the zero cross period by comparing the divided voltage with a first detection reference voltage and a second detection reference voltage having different levels.

20. The device of claim 19, wherein the zero cross detection circuit includes:
a first resistor of which one end is connected to predetermined reference voltage;
a second resistor of which one end is connected to another end of the first resistor;
a third resistor including one end connected to another end of the second resistor and another end which is grounded; and
a hysteresis comparator including an inversion terminal connected to a common node between the first resistor and the second resistor, another inversion terminal connected to a common node between the second resistor and a third resistor, and a non-inversion terminal into which the divided voltage is inputted, and
the first detection reference voltage is a common node voltage at the common node between the second resistor and the third resistor and the second detection reference voltage is a common node voltage at the common node between the first resistor and the second resistor.

* * * * *